(12) United States Patent
Raley et al.

(10) Patent No.: US 8,412,644 B2
(45) Date of Patent: *Apr. 2, 2013

(54) METHOD AND APPARATUS FOR ESTABLISHING USAGE RIGHTS FOR DIGITAL CONTENT TO BE CREATED IN THE FUTURE

(75) Inventors: Michael C. Raley, Downey, CA (US); Edgardo Valenzuela, South Gate, CA (US); Bijan Tadayon, Potomac, MD (US); Aram Nahidipour, Laguna Niguel, CA (US); Xin Wang, Torrance, CA (US); Guillermo Lao, Torrance, CA (US); Thanh Ta, Huntington Beach, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/768,238

(22) Filed: Apr. 27, 2010

(65) Prior Publication Data

US 2010/0241871 A1    Sep. 23, 2010

Related U.S. Application Data

(63) Continuation of application No. 11/052,209, filed on Feb. 8, 2005, now Pat. No. 7,725,401, which is a continuation-in-part of application No. 09/867,747, filed on May 31, 2001, now Pat. No. 6,876,984.

(51) Int. Cl.
*G06F 21/00* (2006.01)

(52) U.S. Cl. ........ 705/904; 705/901; 705/902; 705/903; 705/908; 705/911; 705/51; 705/52; 705/77; 380/227; 380/228; 380/229; 380/230

(58) Field of Classification Search ................ 705/904
See application file for complete search history.

(56) References Cited

U.S. PATENT DOCUMENTS

| 3,263,158 A | 7/1966 | Bargen et al. |
| 3,609,697 A | 9/1971 | Blevins et al. |
| 3,790,700 A | 2/1974 | Callais et al. |

(Continued)

FOREIGN PATENT DOCUMENTS

| BR | 9810967 A | 10/2001 |
| EP | 0 067 556 B1 | 12/1982 |

(Continued)

OTHER PUBLICATIONS

Motoike, Sachiko, "Content Distribution Service Using DVD-ROM", Matsushita Technical Journal, Japan, Oct. 18, 1998, vol. 44, No. 5, pp. 25-33.

(Continued)

*Primary Examiner* — James A Reagan
(74) *Attorney, Agent, or Firm* — Stephen M. Hertzler; Marc S. Kaufman; Reed Smith LLP

(57) ABSTRACT

Usage rights for a digital work are established prior to creation of the corresponding content. The rights can be associated with the content after the content is created. A content creation, such as a video recorder or a still camera, device can store labels of the rights and can associate usage rights with content in real time as the content is created.

45 Claims, 5 Drawing Sheets

U.S. PATENT DOCUMENTS

| | | |
|---|---|---|
| 3,798,605 A | 3/1974 | Feistel |
| 4,159,468 A | 6/1979 | Barnes et al. |
| 4,200,700 A | 4/1980 | Mäder |
| 4,220,991 A | 9/1980 | Hamano et al. |
| 4,278,837 A | 7/1981 | Best |
| 4,323,921 A | 4/1982 | Guillou |
| 4,361,851 A | 11/1982 | Asip et al. |
| 4,423,287 A | 12/1983 | Zeidler |
| 4,429,385 A | 1/1984 | Cichelli et al. |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,652,990 A | 3/1987 | Pailen et al. |
| 4,658,093 A | 4/1987 | Hellman |
| 4,713,753 A | 12/1987 | Beobert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,162 A | 10/1991 | Santon et al. |
| 5,058,164 A | 10/1991 | Elmer et al. |
| 5,103,476 A | 4/1992 | Waite et al. |
| 5,113,519 A | 5/1992 | Johnson et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,204,961 A | 4/1993 | Barlow |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,276,901 A | 1/1994 | Howell et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nagel et al. |
| 5,410,598 A | 4/1995 | Shear |
| 5,412,717 A | 5/1995 | Fischer |
| 5,414,852 A | 5/1995 | Kramer et al. |
| 5,428,529 A | 6/1995 | Hartrick et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A | 5/1997 | Stefik et al. |
| 5,633,932 A | 5/1997 | Davis et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,708,709 A | 1/1998 | Rose |
| 5,708,717 A | 1/1998 | Alasia |
| 5,715,403 A | 2/1998 | Stefik |
| 5,729,741 A | 3/1998 | Liaguno et al. |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,787,172 A | 7/1998 | Arnold |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,825,892 A | 10/1998 | Braudaway et al. |
| 5,838,792 A | 11/1998 | Ganesan |
| 5,848,154 A | 12/1998 | Nishio et al. |
| 5,848,378 A | 12/1998 | Shelton et al. |
| 5,850,443 A | 12/1998 | Van Oorschot et al. |
| 5,862,217 A | 1/1999 | Steinberg et al. |
| 5,862,325 A | 1/1999 | Reed et al. |
| 5,870,473 A | 2/1999 | Boesch et al. |
| 5,889,860 A | 3/1999 | Eller et al. |
| 5,892,900 A | 4/1999 | Ginter et al. |
| 5,910,987 A | 6/1999 | Ginter et al. |

| | | | | | | |
|---|---|---|---|---|---|---|
| 5,915,019 A | 6/1999 | Ginter et al. | | 6,526,508 B2 | 2/2003 | Akins et al. |
| 5,917,912 A | 6/1999 | Ginter et al. | | 6,560,340 B1 | 5/2003 | Akins et al. |
| 5,920,861 A | 7/1999 | Hall et al. | | 6,574,609 B1 | 6/2003 | Downs et al. |
| 5,933,498 A | 8/1999 | Schneck et al. | | 6,581,161 B1 | 6/2003 | Byford |
| 5,940,504 A | 8/1999 | Griswold | | 6,587,837 B1 | 7/2003 | Spagna et al. |
| 5,943,422 A | 8/1999 | Van Wie et al. | | 6,611,812 B2 | 8/2003 | Hurtado et al. |
| 5,949,876 A | 9/1999 | Ginter et al. | | 6,796,555 B1 | 9/2004 | Blahut |
| 5,953,419 A | 9/1999 | Lohstroh et al. | | 6,834,110 B1 | 12/2004 | Marconcini et al. |
| 5,968,175 A | 10/1999 | Morishita et al. | | 6,853,728 B1 | 2/2005 | Kahn et al. |
| 5,982,891 A | 11/1999 | Ginter et al. | | 6,859,791 B1 | 2/2005 | Spagna et al. |
| 5,983,207 A | 11/1999 | Turk et al. | | 6,904,522 B1 | 6/2005 | Benardeau et al. |
| 5,987,134 A | 11/1999 | Shin et al. | | 6,959,288 B1 | 10/2005 | Medina et al. |
| 5,999,624 A | 12/1999 | Hopkins | | 6,973,458 B1 | 12/2005 | Maeda et al. |
| 5,999,949 A | 12/1999 | Crandall | | 6,983,371 B1 | 1/2006 | Hurtado et al. |
| 6,006,332 A | 12/1999 | Rabne et al. | | 7,080,139 B1 | 7/2006 | Briggs et al. |
| 6,020,882 A | 2/2000 | Kinghorn et al. | | 7,168,036 B1 | 1/2007 | Klotz, Jr. et al. |
| 6,047,067 A | 4/2000 | Rosen | | 7,206,755 B1 | 4/2007 | Muralidhar |
| 6,073,234 A | 6/2000 | Kigo et al. | | 7,213,261 B1 | 5/2007 | Gomez et al. |
| 6,088,717 A | 7/2000 | Reed et al. | | 7,240,359 B1 | 7/2007 | Sie et al. |
| 6,091,777 A | 7/2000 | Guetz et al. | | 7,467,212 B2 | 12/2008 | Adams et al. |
| 6,105,134 A | 8/2000 | Pinder et al. | | 7,484,246 B2 | 1/2009 | Matsuyama et al. |
| 6,112,181 A | 8/2000 | Shear et al. | | 2001/0001014 A1 | 5/2001 | Akins et al. |
| 6,112,239 A | 8/2000 | Kenner et al. | | 2001/0009026 A1 | 7/2001 | Terao et al. |
| 6,115,471 A | 9/2000 | Oki et al. | | 2001/0010045 A1 | 7/2001 | Stefik et al. |
| 6,135,646 A | 10/2000 | Kahn et al. | | 2001/0010046 A1 | 7/2001 | Muyres et al. |
| 6,138,119 A | 10/2000 | Hall et al. | | 2001/0011276 A1 | 8/2001 | Durst, Jr. et al. |
| 6,141,754 A | 10/2000 | Choy | | 2001/0014206 A1 | 8/2001 | Artigalas et al. |
| 6,157,719 A | 12/2000 | Wasilewski et al. | | 2001/0023417 A1 | 9/2001 | Stefik et al. |
| 6,157,721 A | 12/2000 | Shear et al. | | 2001/0037467 A1 | 11/2001 | O'Toole, Jr. et al. |
| 6,169,976 B1 | 1/2001 | Colosso | | 2001/0039659 A1 | 11/2001 | Simmons et al. |
| 6,185,683 B1 | 2/2001 | Ginter et al. | | 2001/0042016 A1 | 11/2001 | Muyres et al. |
| 6,189,037 B1 | 2/2001 | Adams et al. | | 2001/0046299 A1 | 11/2001 | Wasilewski et al. |
| 6,189,146 B1 | 2/2001 | Misra et al. | | 2001/0049824 A1 | 12/2001 | Baker et al. |
| 6,192,165 B1 | 2/2001 | Irons | | 2001/0056405 A1 | 12/2001 | Muyres et al. |
| 6,209,092 B1 | 3/2001 | Linnartz | | 2002/0001387 A1 | 1/2002 | Dillon |
| 6,209,787 B1 | 4/2001 | Iida | | 2002/0002488 A1 | 1/2002 | Muyres et al. |
| 6,216,112 B1 | 4/2001 | Fuller et al. | | 2002/0004744 A1 | 1/2002 | Muyres et al. |
| 6,219,652 B1 | 4/2001 | Carter et al. | | 2002/0004779 A1 | 1/2002 | Turk et al. |
| 6,223,286 B1 | 4/2001 | Hashimoto | | 2002/0035618 A1 | 3/2002 | Mendez et al. |
| 6,226,618 B1 | 5/2001 | Downs et al. | | 2002/0044658 A1 | 4/2002 | Wasilewski et al. |
| 6,233,684 B1 | 5/2001 | Stefik et al. | | 2002/0049717 A1 | 4/2002 | Routtenberg et al. |
| 6,236,971 B1 | 5/2001 | Stefik et al. | | 2002/0051407 A1 | 5/2002 | Griner et al. |
| 6,237,786 B1 | 5/2001 | Ginter et al. | | 2002/0056118 A1 | 5/2002 | Hunter et al. |
| 6,240,185 B1 | 5/2001 | Van Wie et al. | | 2002/0069282 A1 | 6/2002 | Reisman |
| 6,246,767 B1 | 6/2001 | Akins et al. | | 2002/0071556 A1 | 6/2002 | Moskowitz et al. |
| 6,252,964 B1 | 6/2001 | Wasilewski et al. | | 2002/0077984 A1 | 6/2002 | Ireton |
| 6,253,193 B1 | 6/2001 | Ginter et al. | | 2002/0083006 A1 | 6/2002 | Headings et al. |
| 6,263,313 B1 | 7/2001 | Milsted et al. | | 2002/0099948 A1 | 7/2002 | Kocher et al. |
| 6,266,618 B1 | 7/2001 | Ye et al. | | 2002/0127423 A1 | 9/2002 | Kayanakis |
| 6,289,455 B1 | 9/2001 | Kocher et al. | | 2002/0128972 A1* | 9/2002 | Stefik et al. ............. 705/52 |
| 6,292,568 B1 | 9/2001 | Akins et al. | | 2002/0143565 A1* | 10/2002 | Headings et al. ............. 705/1 |
| 6,292,569 B1 | 9/2001 | Shear et al. | | 2002/0154157 A1 | 10/2002 | Sherr et al. |
| 6,301,660 B1 | 10/2001 | Benson | | 2002/0161473 A1 | 10/2002 | Higuchi et al. |
| 6,307,939 B1 | 10/2001 | Vigarie | | 2002/0184158 A1 | 12/2002 | Tadayon et al. |
| 6,311,214 B1 | 10/2001 | Rhoads | | 2003/0023564 A1 | 1/2003 | Padhye et al. |
| 6,314,408 B1 | 11/2001 | Salas et al. | | 2003/0046238 A1 | 3/2003 | Nonaka et al. |
| 6,327,652 B1 | 12/2001 | England et al. | | 2003/0097567 A1 | 5/2003 | Terao et al. |
| 6,330,670 B1 | 12/2001 | England et al. | | 2003/0105718 A1 | 6/2003 | Hurtado et al. |
| 6,345,256 B1 | 2/2002 | Milsted et al. | | 2003/0135464 A1 | 7/2003 | Mourad et al. |
| 6,345,288 B1 | 2/2002 | Reed et al. | | 2003/0161473 A1 | 8/2003 | Fransdonk |
| 6,353,888 B1 | 3/2002 | Kakehi et al. | | 2004/0015437 A1 | 1/2004 | Choi et al. |
| 6,363,488 B1 | 3/2002 | Ginter et al. | | 2004/0024688 A1 | 2/2004 | Bi et al. |
| 6,385,596 B1 | 5/2002 | Wiser et al. | | 2004/0052370 A1 | 3/2004 | Katznelson |
| 6,389,402 B1 | 5/2002 | Ginter et al. | | 2004/0172552 A1 | 9/2004 | Boyles et al. |
| 6,389,403 B1 | 5/2002 | Dorak, Jr. | | 2007/0244812 A1 | 10/2007 | Turk et al. |
| 6,389,538 B1 | 5/2002 | Gruse et al. | | 2010/0106659 A1 | 4/2010 | Stefik et al. |
| 6,397,333 B1 | 5/2002 | Söhne et al. | | | | |
| 6,398,245 B1 | 6/2002 | Gruse et al. | | FOREIGN PATENT DOCUMENTS | | |
| 6,401,211 B1 | 6/2002 | Brezak, Jr. et al. | | EP | 0 084 441 | 7/1983 |
| 6,405,369 B1 | 6/2002 | Tsuria | | EP | 0 180 460 | 5/1986 |
| 6,418,421 B1 | 7/2002 | Hurtado et al. | | EP | 0 257 585 A2 | 3/1988 |
| 6,424,717 B1 | 7/2002 | Pinder et al. | | EP | 0 262 025 | 3/1988 |
| 6,424,947 B1 | 7/2002 | Tsuria et al. | | EP | 0 332 304 A2 | 9/1989 |
| 6,487,659 B1 | 11/2002 | Kigo et al. | | EP | 0 332 707 | 9/1989 |
| 6,516,052 B2 | 2/2003 | Voudouris | | EP | 0 393 806 | 10/1990 |
| 6,516,412 B2 | 2/2003 | Wasilewski et al. | | EP | 0398492 A2 | 11/1990 |
| 6,516,413 B1 | 2/2003 | Aratani et al. | | EP | 0 450 841 A2 | 10/1991 |
| 6,523,113 B1 | 2/2003 | Wehrenberg | | EP | 0 529 261 A2 | 3/1993 |
| 6,523,745 B1 | 2/2003 | Tamori | | EP | 0588415 A1 | 3/1994 |

| | | |
|---|---|---|
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1045388 A1 | 10/2000 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3-063717 | 3/1991 |
| JP | H4-180451 | 6/1992 |
| JP | 04-369068 | 12/1992 |
| JP | 5-100939 | 4/1993 |
| JP | 5168039 A2 | 7/1993 |
| JP | 05-268415 | 10/1993 |
| JP | 6-131371 | 5/1994 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 0 715 241 | 6/1996 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2000-322352 | 11/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |
| WO | WO 93/01550 | 1/1993 |
| WO | WO 93/01550 A1 | 1/1993 |
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/24186 | 6/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/01138 | 1/2000 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/09703 A1 | 2/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

Blaze et al, "Divertible Protocols and Atomic Proxy Cryptography" 1998 Advances in Cryptography—Euro Crypt International Conference on the Theory and Application of Crypto Techniques, Springer Verlag, DE.

Blaze et al, "Atomic Proxy Cryptography" Draft (Online) (Nov. 2, 1997) XP002239619 Retrieved from the Internet.

No Author, "Capability- and Object-Based Systems Concepts," Capability-Based Computer Systems, pp. 1-19 (no date).

Cox, "Superdistribution" Wired Magazine (Sep. 1994) XP002233405 URL:http://www.wired.com/wired/archive/2.09/superdis_pr.html>.

Dunlop et al, Telecommunications Engineering, pp. 346-352 (1984).

Elgamal, "A Public Key Cryptosystem and a Signature Scheme Based on Discrete Logarithms," IEEE Transactions on Information Theory IT-31(4):469-472 (Jul. 1985).

Gheorghiu et al., "Authorization for Metacomputing Applications" (no date).

Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima-ip-workshop/kahn.html.

Kahn et al, "The Digital Library Project, vol. 1: The World of Knowbots (Draft), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACSIP '97 Proceedings, pp. 271-282 (Sydney, NSW, Australia, Jul. 7-9, 1997, Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.
Samuelson et al, "Intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pages, pp. 469-472, 593-594 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
AH Digital Audio and Video Series, "DTV Receivers and Measurements," Understanding Digital Terrestrial Broadcasting, pp. 159-164 (no date).
O'Driscoll, The Essential Guide to Digital Set-Top Boxes and Interactive TV, pp. 6-24 (no date).
IUS MENTIS, "The ElGamal Public Key System," pp. 1-2 (Oct. 1, 2005) online at http://www.iusmentis.com/technology/encyrption/elgamal/.
Schneier, "Crypto Bibliography," Index of Crypto Papers Available Online, pp. 1-2 (online) (no date).
No Author, No Title, pp. 344-355 (no date).
No Author, "Part Four Networks," No Title, pp. 639-714 (no date).
Microsoft Word User's Guide, pp. 773-774, 315-316, 487-489, 561-564, 744, 624-633 (1993).
No Author, "What is the ElGamal Cryptosystem," p. 1 (Nov. 27, 2006) online at http://www.x5.net/faqs/crypto/q29.html.
Johnson et al., "A Secure Distributed Capability Based System," ACM, pp. 392-402 (1985).
Wikipedia, "El Gamal Encyption," pp. 1-3 (last modified Nov. 2, 2006) online at http://en.wikipedia.org/wiki/ElGamal_encryption.
Blaze, "Atomic Proxy Cryptography," p. 1 Abstract (Oct. 20, 1998).
Blaze, "Matt Blaze's Technical Papers," pp. 1-6 (last updated Aug. 6, 2006)].
Online Search Results for "inverted file", "inverted index" from www.techweb.com, www.cryer.co.uk, computing-dictionary.thefreedictionary.com, www.nist.gov, en.wikipedia.org, www.tiscali.co.uk (Jul. 15-16, 2006).
Corporation for National Research Initiatives, "Digital Object Architecture Project", http://www.nnri.reston.va.us/doa.html (updated Nov. 28, 2006).
Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).
Johnson et al.., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).
Delaigle, "Digital Watermarking, " Spie Conference in Optical Security and Counterfeit Deterrence Techniques, San Jose, CA (Feb. 1996).
Perritt, "Technologies Strategies for Protecting Intellectual Property in the Networked Multimedia Environment," Knowbots, Permissions Headers and Contract Law (Apr. 2-3, 1993).
International Search Report issued in corresponding Application No. PCT/US05/00337 mailed Aug. 24, 2007.
"National Semiconductor and EPR Partner for Information Metering/Data Security Cards" Mar. 4, 1994, Press Release from Electronic Publishing Resources, Inc.
Weber, R., "Digital Rights Management Technology" Oct. 1995.
Flasche, U. et al., "Decentralized Processing of Documents", pp. 119-131, 1986, Comput. & Graphics, vol. 10, No. 2.
Mori, R. et al., "Superdistribution: The Concept and the Architecture", pp. 1133-1146, 1990. The Transactions of the IEICE, Vo. E 73, No. 7, Tokyo, JP.

Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionize Software Pricing and Distribution; Wave Systems Corp.", pp. 1-3, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 1-6, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue 1.
Sirbu, M., "Internet Billing Service Design and prototype Implementation", pp. 67-80, Jan. 1994, IMA Intellectual Property Project Proceedings, vol. 1, Issue 1.
Simmell, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.
Tygar, J. et al., "Dyad: A System for Using Physically Secure Coprocessors", pp. 121-152, Jan. 1994, IMA Intellectual Property Project Proceedings, vol. 1, Issue 1.
Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", pp. 1-24, 1990, Research Report DEC Systems Research Center.
Mark Stefik, "Letting Loose the Light: Igniting Commerce in Electronic Publication", pp. 219-253, 1996, Internet Dreams: Archetypes, Myths, and Metaphors, IDSN 0-262-19373-6.
Mark Stefik, "Letting Loose the Light: Igniting Commerce in Electronic Publication", pp. 2-35, Feb. 8, 1995, Internet Dreams: Archetypes, Myths and Metaphors.
Henry H. Perritt, Jr., "Technological Strategies for Protecting Intellectual Property in the Networked Multimedia Environment", Apr. 2-3, 1993, Knowbots, Permissions Headers & Contract Law.
"Reciprocal and Advanced Marketing Services, Inc. Enter into an Agreement to Create a Secure Virtual Wholesaler for Digital Content", PR Newswire, Nov. 6, 2000.
Lampson et al., Authentication in Distributed Systems: Theory and Practice, ACM, 1992, pp. 1-47.
Kohl, John T. et al., "The Evolution of the Kerberos Authentication Service", Distributed Open Systems, IEEE, 1994, 18 pages.
Final Office Action dated Apr. 5, 2012 in U.S. Appl. No. 11/730,972.

* cited by examiner

METHOD AND APPARATUS FOR ESTABLISHING USAGE RIGHTS FOR DIGITAL CONTENT TO BE CREATED IN THE FUTURE

RELATED APPLICATION DATA

This application is a continuation of U.S. patent application Ser. No. 11/052,209, filed Feb. 8, 2005, which is a continuation-in-part of U.S. patent application Ser. No. 09/867,747, filed May 31, 2001, now U.S. Pat. No. 6,876,984, the disclosures of which are hereby incorporated by reference in their entireties.

BACKGROUND OF THE INVENTION

This invention relates generally to assignment of usage rights for digital works. In particular, this invention relates to establishing usage rights for before the content is created. Content that has not yet been created can be, for example, a live event (such as a sports event) that has not yet happened. It can also be, for example, a movie that has not yet been filmed or a book that has not yet been written. Moreover, the content in question could be, for example, a movie created many years ago. In that example this invention would pertain to the version of that movie in digital form, prepared and packaged for distribution in a manner described in this invention. Similarly, a two thousand year old book prepared as a new digital work can be content to be created in the future equally as with the case of the book that has not yet been written. Further, an item of content already in digital form can be content that has not been created where a new digital instantiation of the content is created.

One of the most important issues impeding the widespread distribution of digital works via electronic means, and the Internet in particular, is the current lack of protection of intellectual property rights of content owners during the distribution and the usage of the digital content. Efforts to resolve these issues have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management" ("DRM") herein.

Due to the expansion of the Internet in the recent years, and the issues relating to privacy, authentication, authorization, accounting, payment and financial clearing, rights specification, rights verification, rights enforcement, document protection, and collection of licensing fees DRM has become even more important. Because the Internet is such a widely used network whereby many computer users communicate and trade ideas and information, the freedom at which electronically published works are reproduced and distributed is widespread and commonplace.

Two basic types DRM of schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's CRYPTOLOPES™ and InterTrust's DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems such as PC and workstations using browsers to access the Web, will be the dominant systems used to access digital works. In this sense, existing computing environments such as PCs and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. Nos. 5,530,235, 5,634,012, 5,715,403, 5,638,443, and 5,629,980 introduced many basic concept of DRM. All of these patents are hereby incorporated herein by reference in their entirety. U.S. Pat. No. 5,634,012 discloses a system for controlling the distribution of digital documents. Each rendering device has a repository associated therewith. A predetermined set of usage transaction steps define a protocol used by the repositories for carrying out usage rights associated with a document. Usage rights are encapsulated with the content or otherwise associated with the digital work to travel with the content. The usage rights can permit various types of use such as, viewing only, use once, distribution, and the like. Rights can be granted based on payment or other conditions.

In conventional DRM techniques, a content owner, or other authorized party, specifies the rights after the content has been created and protects, e.g. encrypts, the content at the same time. A private key is used to encrypt the content, and a label is generated which specifies the usage rights. The rights label and the protected content are then associated and stored. A license to the content can later be generated for a user to permit the user to use or access the content. The license includes a private key which has been encrypted using a public key in known manner.

To access the content, the private key can be used to decrypt the encrypted public key, allowing the user to decrypt the content. This technique works well if the content is available at the time of the rights specification. However, this technique breaks-down if one wants to specify rights for content and issue a license for the content before the content is available. For example, a distributor of streaming video to a live future event, or of photographs to a future event, may want to begin selling licenses to the content prior to the event. Conventional DRM systems fall short of presenting processes for improving the security, user interface, organization, structure, and accuracy of the DRM system, particularly for those works that are not yet in existence.

SUMMARY OF THE INVENTION

An object of the invention is to obviate the problems noted above in the prior technology and permit usage rights to be assigned to a work prior to creation of the work.

A first aspect of the invention is a method for creating a digital work having content and usage rights related to the content. The method comprises generating a label associated with content of a digital work before the content is created, associating the label with the content and securing the content and the label.

BRIEF DESCRIPTION OF THE DRAWING

Various embodiments of this invention will be described in detail, with reference to the following figures, wherein.

DETAILED DESCRIPTION

The phrase "digital work" as used herein refers to any type of element having content in computed readable form. "Content" as used herein refers to the viewable or otherwise usable portion of a digital work. The phrase "usage rights" refers to permissions, in the form of a manner of use, granted to a user of an existing digital work or a digital work to be created in the future with respect to use, access, distribution, and the like of the content of the work. In addition, usage rights may have one or more conditions which must be satisfied before the permissions may be exercised.

Figure 1:
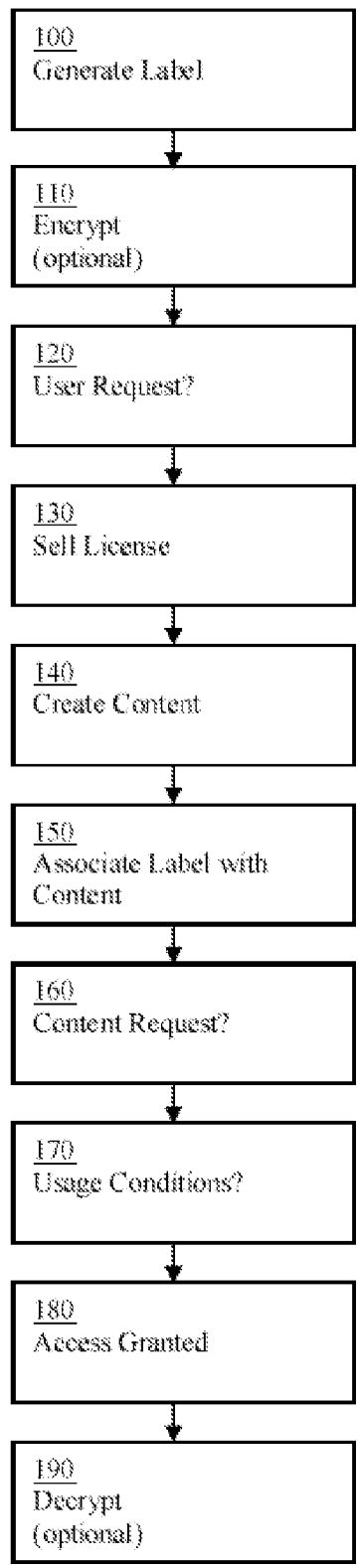
FIG. 1 is a flowchart of a method for providing usage rights for digital content before creation of the content in accordance with the an embodiment of the invention.

FIG. 1 illustrates an embodiment of a method for providing usage rights for content of a digital work before the content is created. For each step in this illustration, it is possible that the content, license, label, keys or other data used may be encrypted for added security. In step 100 a label specifying usage rights, to be associated with digital content that is not yet created, is generated. The usage rights label can include usage rights, such as the right to print, copy, alter, edit or view the digital work or any other right, permission, or restriction, such as those contained in the XrML™ language or other usage rights grammar. Alternatively, the usage rights label may include merely an identification of the work and other descriptive data and the specific granted usage rights can be contained in the license discussed below. In the case of using the XrML™ language, the label can be an extensible markup language (XML) document specifying the usage rights. In addition, the future content can have many different versions of usage rights and thus a label can be generated for each version. In step 110, a key, such as a conventional public key, is generated in a known manner and associated with the label.

In step 120, a user request for use of, i.e. a license to, the content to be created is received. Keep in mind that the content itself need not be in existence yet. For example, the content can be a video recording or stream of a sporting event to occur in the future. In step 130, a distributor of the content, or another authorized party, issues a license to the user. The license can include a private key corresponding to the public key generated in step 110 and may include usage rights or other descriptive data. Once, again, keep in mind that the content itself need not be in existence yet. Accordingly, the distributor is able to sell a license to view the event prior to the event.

In step 140, the content is created. Of course, this step can be accomplished by another party. However the content is created, the salient point is that the content somehow comes into existence after rights are assigned for it. The usage rights label can be encapsulated with or attached to the content whereby copies of the digital work will also carry the usage rights label. Alternatively, the label can be stored separately from the content but be associated through flags, calls, or the like. Therefore, the term "associated" as used herein refers broadly to creating a correspondence between the content and the label so the label will be applied to the content. Once the usage rights label is associated with the content, the content can be secured using the key generated in step 110. The digital content can be secured through any form of encryption or other known technique. For example pretty good privacy (PGP) encryption procedures can be used.

In step 160, the process determines whether there is a request for access to the secured digital content. If there are no requests, the process waits for a request. However, if there is a request for access, the process proceeds to step 170 where the usage rights associated with the digital work and/or license are checked to determine whether all the conditions, such as payment, associated with the usage rights have been satisfied. If all the conditions have been satisfied, the process proceeds to step 180 in which access to the content is granted, i.e., the content is downloaded, streamed, or otherwise transferred to the user. In step 190, the user's private key is used to decrypt the content in a known manner.

The association of the usage rights with the content may occur in a variety of ways. For example, if the usage rights will be the same for the entire content of a digital work, the usage rights can be attached when the digital work is processed for deposit in a distribution server of other device. However, if the content of the digital work has a variety of different usage rights for various components, the usage rights can be attached as the work is being created. Various authoring tools and/or digital work assembling tools can be utilized for providing an automated process of attaching the usage rights. Because each part of a digital work can have its own usage rights, there can be instances where the usage rights of a "part" will be different from its parent. As such, conflict rules can be established to dictate when and how a right may be exercised.

Figure 2:
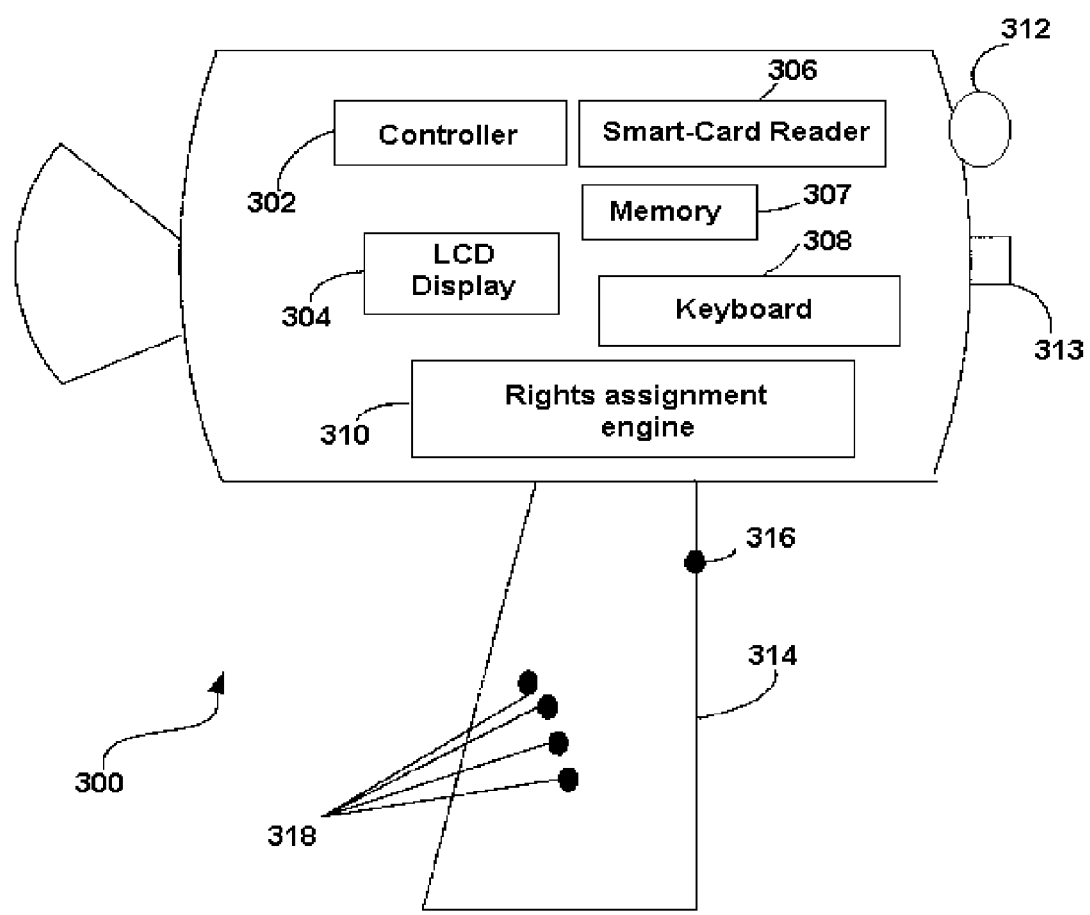
FIG. 2 is a content creation device for providing usage rights for digital content to be created in the future in accordance with an embodiment of the invention.

FIG. 2 illustrates a content creation device, a video recorder, in accordance with a preferred embodiment of the invention. The content creation device 300 includes a controller 302, a LCD display 304, a smart-card reader 306, a memory 307, a keypad 308, a rights assignment engine 310, eye/iris recognition sensors 312, a cable connection 313, a handle 314, and symmetric finger print recognition sensors 316,318. Also, lens system 320 permits recording of video images. Controller 302 and rights assignment engine 310 of the preferred embodiment are accomplished through a microprocessor based device programmed in a desired manner.

While FIG. 2 shows the controller 302 and the rights assignment engine 310 as separate units, the functions performed by these units may be combined in one processor or may be further divided among plural processors such as digital signal processors and/or performed by dedicated hardware such as application specific integrated circuits (ASIC), e.g., hard-wired electronic or logic circuits or programmable logic devices, or other hardware or software implementations.

The smart-card reader 306 can be used for reading cards inserted therein. For example, a license, usage rights, or identification can be embedded in the card and communicated to the controller 302 and/or the rights assignment engine 310. LCD display 304, the smart card reader 306, keypad 308 and software interfaces constitute a user interface of creation server 300. The user interface permits a user to input information such as identification data, and access requests and provides feedback as to operation of creation device 300. The content creation device 300 of the preferred embodiment is a video recorder; however, it can be any type of recording device, for example, a still-image camera, an animation generator, or an audio recorder.

The rights assignment engine 310 can be accessed via the cable connection 313. For example, a rights assignment computer (not illustrated), such as any computer running XrML™ and related tools, can be coupled to the rights assignment engine 310 via cable connection 313 to download a usage rights label or template, similar to the label described above, indicating usage rights for content to be created by the content creation device 300 in the future. Any content created by the content creation device 300 will automatically be associated with the usage rights label or labels stored in rights assignment engine 310. Alternatively, the usage rights label can be composed using the user interface of creation device 300. In either case, one or more labels are and corresponding keys generated and stored in rights assignment engine 310 along with instructions indicating how the labels are to be assigned to content recorded by creation device. 300.

The instructions can cause the usage rights labels to be assigned in any manner and can include any permissions and/or restrictions. For example, in the case of a video recorder, each part of the video sequence or frames can selectively be assigned different rights. This makes the rights assignment process very flexible and dynamic and permits rights assignment to be made in real time as content is created or prior to creation.

The content creation device 300 can utilize a unique device ID, a user's smart card, encryption (e.g. PKI) technology, a PIN, or any biometrics system to assign rights based on the identity of the user, the recording device itself, the data on the smart card, or the like. For example, fingerprint recognition sensors 316, 318 or iris recognition sensor 312 can be used for recognition or authentication of the user's identify to permit rights assignment engine 310 to use a corresponding set of rights associated with the user. For example, all content recorded by person A will have one set of rights and all content recorded by person B will have a different set of rights.

The content creation device 300 records content in a conventional manner. However, labels and keys generated in steps 100 and 110 described above are stored and associated with content recorded by content recorder 300 during or soon after recording. Accordingly, steps 140 and 150 described above are also accomplished by content creation device 300. For security purposes, a token or pre-paid card (or magnetic card and smart card, or any of its variations, such as memory-type or synchronous communication card, ISO 7816-compliant card, EMV-type card) can be used for the storage of fees and micro-payments, or keeping track of those fees with associated rights. Such cards can be read using the smart card reader 306.

It can be seen that the invention permits usage rights for a work to be created and associated with content prior to the creation of the content. The usage rights define how the future digital work may be used and distributed. These pre-established usage rights become apart of the future digital work and controls the usage and distribution of the content of such work.

In the preferred embodiment, after the rights have been established for a future content, a private key associated with the future content is assigned and a rights label is generated. This private key, along with the rights label, is stored. A user can purchase the content (present or future) after the label has been inserted into the main server or other devices. After the content is purchased, the content owner can get a license for encryption which contains the public key encrypted by a private key. Alternatively, a single symmetric key can be used.

The label represented by step 100 in FIG. 1 may serve as a reference to another work. The label in this case would serve as a placeholder for future content. The label may be an empty file or contain computer interpretable or human interpretable data that may be used to later associate it with the future digital content. When it is created the label may include usage right information but it does not need to. The usage rights information can be supplied later. When the usage rights are generated, as represented by step 130 in FIG. 1, the content referred to by the usage rights would be the label, and need not be the actual digital content. The label could then be referenced to determine which digital content the user is requesting access to. The means of associating the label with the actual content may be done in a variety of ways including the use of human-interpretable text, numeric references, pointers, markup languages such as HTML and XML, programmable scripts or even SQL queries.

Figure 3:
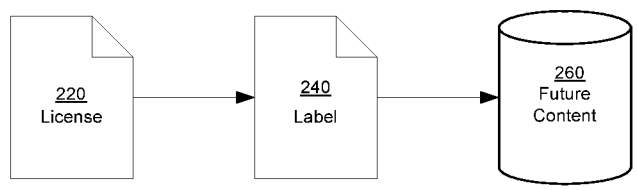
FIG. 3 illustrates the relationship between usage rights, a label and future digital content in accordance with an embodiment for this invention.

FIG. 3 illustrates this embodiment. In FIG. 3, license 220 containing usage rights is issued to a user. Since digital content 260 for the license does not yet exist, label 240 is created to act as a placeholder for the future content. The label would contain or imply a relationship between itself and digital content to be created in the future. This relationship may be implied such as naming the label using a product ID or other reference that can later be associated with the digital content, or it may be an actual reference such as human-interpretable text containing the name of the future content or content within the label that can later be used to derive the actual digital content. The label to which the license is bound is used in the appropriate manner to determine the actual digital content with which the label is associated. The rights and any conditions specified in the usage rights would apply to the actual content, not the label that it represents. The steps discussed above do not necessarily have to be performed in the order shown in the figure. For example, the label can be created before or after the license and before or after the content.

Usage rights associated with the future digital content may be specified within a license, the label or even the content itself. These usage rights apply to the digital content pointed to by the label, regardless of where they are stored and the method used for storage.

Figure 5:
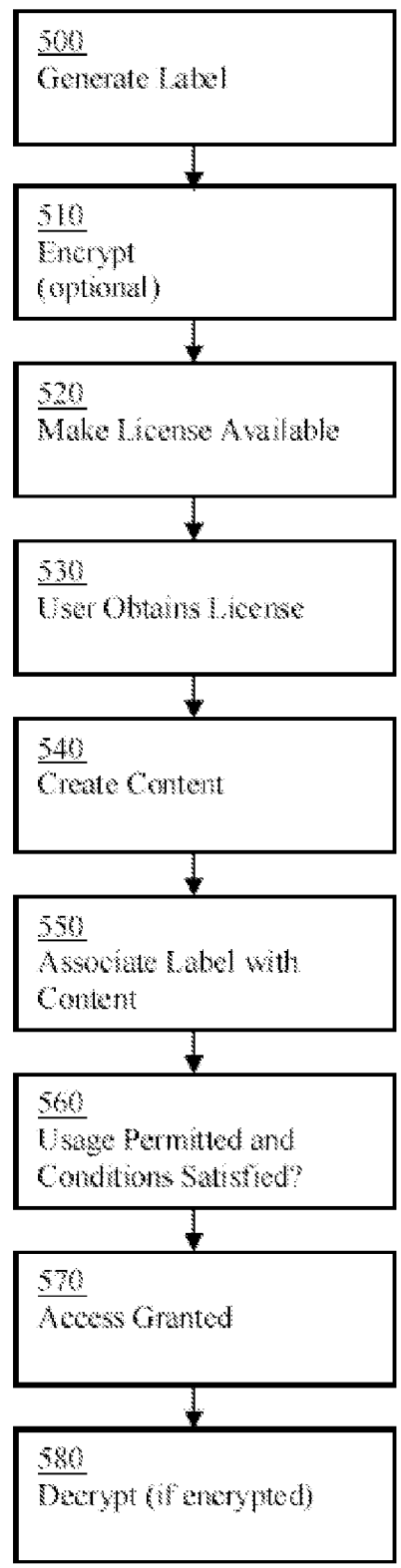
FIG. 5 is a flowchart of a method for providing usage rights for digital content to be created in accordance with an embodiment of the invention.

FIG. 5 illustrates an embodiment of a method for providing usage rights for content of a digital work that is created dynamically at the time the user requests it. The steps illustrated in FIG. 5 do not necessarily have to be performed in the order shown in the figure. For example the label can be created before or after the license and before or after the content. In step 500 a label representing digital content that is not yet created, is generated. The label can include usage rights, such as the right to print, copy, alter, edit or view the digital work or any other right, permission, condition or restriction, such as those contained in the ISO MPEG REL, XrML, ODRL, the Open Mobile Alliance REL or any other usage rights grammar. Alternatively, the usage rights label may include merely an identification of the work and other descriptive data and the specific granted usage rights can be contained in the license discussed below. In the case of using the ISO MPEG REL for example, the label can be an extensible markup language (XML) document specifying the usage rights. In addition, the future content can have many different versions of usage rights and thus a label can be generated for each version. In step 510, the label may be protected by using known encryption techniques.

In step 520, a distributor of the content, or another authorized party, makes available a license to a user. The license can be protected using a private key such as the one corresponding to the public key generated in step 110 and may include usage rights or other descriptive data. Once, again, keep in mind that the content itself need not be in existence yet. Accordingly, for example, a distributor is able to offer a license to view an event prior to the event occurring.

In step 530, a user obtains a license to (i.e. receives the right to use) the content to be created. The user may request the license or may receive the license without requesting it. Keep in mind that the content itself need not be in existence yet. For example, the content can be a video recording or stream of a sporting event to occur in the future.

In step 540, the content is created. Of course, this step can be accomplished by another party. However the content is created, the salient point is that the content somehow comes into existence after rights are assigned for it. In this embodiment, the content is created in response to the request for content performed previously in step 530. After the content is created, the label is associated with the content in step 550. The label can be encapsulated with or attached to the content whereby copies of the digital work will also carry the label. Alternatively, the label can be stored separately from the content but be associated through flags, calls, or the like. Therefore, the term "associated" as used herein refers broadly to creating a correspondence between the content and the label so the label will be applied to represent the content. Once the usage rights label is associated with the content, the content may or may not be secured using the key generated in step 510. The digital content can be secured through any form of encryption or other known technique. For example pretty good privacy (PGP) encryption procedures can be used.

In step 560 the usage rights associated with the digital work and/or license are checked to determine whether the use of the digital work is permitted by the usage rights and if there are conditions to the use, all the conditions, such as payment, associated with the usage rights whether the conditions have been satisfied. If the use attempted by the user is permitted and all the conditions, if any, have been satisfied, the process proceeds to step 570 in which access to the content is granted (e.g., the content is downloaded, streamed, or otherwise transferred to the user or the user is permitted to render the content or otherwise use the content in the permitted manner). In step 580, if the content was encrypted the user's private key is used to decrypt the content in a known manner.

The invention can be used in a subscription model (for example, for magazine or marketing reports) in which the future issues of the content have not been published, but the rights for those issues have already been assigned and stored. At an appropriate future time, the rights will be associated with the corresponding content. For example, by selling the content of a future event on a web site before the actual event, the traffic of the Web site can be drastically reduced and distributed over a longer period of time, making the requirements for the servers and the Web site easier to satisfy and less expensive to operate. Note, however, that the Web site selling the rights or tickets, i.e. the license, might be different from the Web site providing the content later on.

The invention may also be used in a flexible subscription model such as identifying multiple issues of a periodical. In this case, the label might contain human-readable text such as "Issues 34-56 of Newsweek Online" with the usage rights to the content specified in a separate license. The label in this case could represent multiple digital works with a single label.

Another possible use for this invention is the area of services. Some services take an instruction and then generate content as a return value. For example; a user may send a request to a service which contains some information about their operating system, platform or environment. The service could utilize this information to generate or select content appropriate to the user from plural instances of content and return both the content and usage rights that would allow the user to utilize the content. In other words, the service could generate protected digital content customized to a user service 400 receivers environment, such as the user's identity preferences, or computer system.

Figure 4:
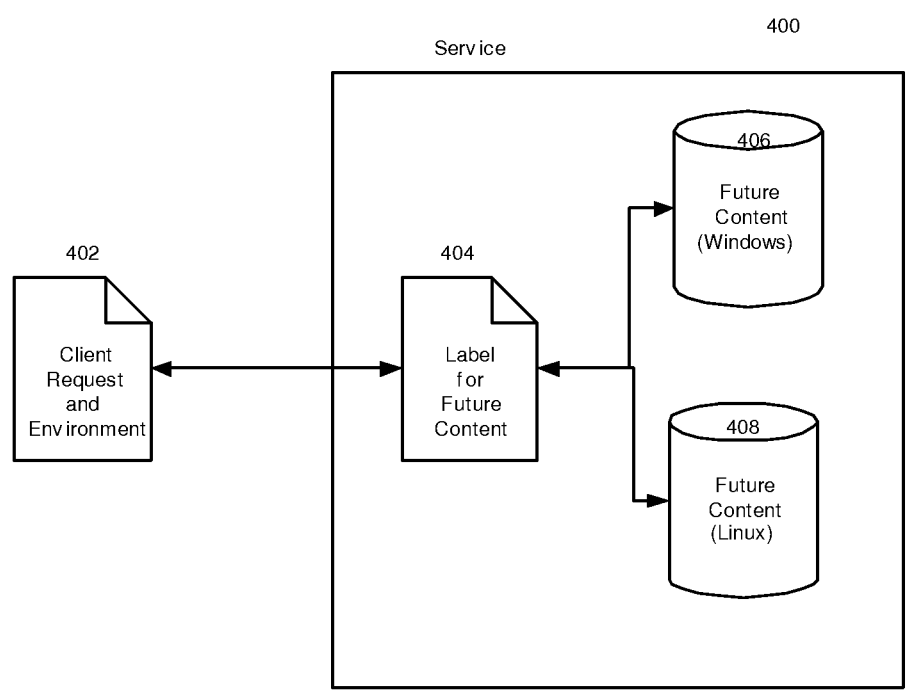
FIG. 4 is a black diagram of a service which selects appropriate protected digital content based on the client's environment in accordance with an embodiment of the invention.

FIG. 4 illustrates this embodiment. Client request 402, consisting of a set of usage rights, along with information about the client environment. The request or usage rights are bound to label which exists within the service. When the service receives the request, it references the indicated label, combined with the client environment information to determine which content, Windows content 406 or Linux content 407 for example, is best suited to the user. As in previous embodiments, the usage rights and label were created prior to the existence of the digital content. Simply put, this embodiment allows the pre-sale and licensing of protected digital content.

This invention may even be used to help manage limited distribution where digital content is regulated or limited in some fashion. Imagine a content creator that wishes to restrict the number of copies a particular distributor is capable to selling. Such a business model might be created by placing a unique identifier on each copy of the digital content the creator gives to the distributor. This identifier might be a unique serial number or simply a date & time stamp. The distributor is given only the number of individualized copies of the digital content that they are authorized to sell each month. Once the quantity has been distributed, rather than turning away customers, the distributor might choose to use a label to represent the content they will receive the following month. This would allow them to better serve their customers, continue distribution of the content while at the same time honoring the content creator's desires by only distributing a limited amount each month.

Also, the invention allows a newspaper editor, for example, to send a camera crew to record content without worrying about the pictures being compromised in any way (for example, altered, edited, viewed by unauthorized personnel, or hidden and separately sold to another newspaper organization). In fact, the camera crew may have no rights whatsoever in the content as soon as the content is recorded.

Alternatively the editor can set the rights in such a way that the first 10 pictures, for example, will belong to the newspaper (work-related), and the next five pictures will belong to the cameraman (for personal use). This example illustrates the flexibility, security, confidence, certainty, and multiple relationships that can be arranged between parties (the cameraman and the editor in this example).

All future content may be assigned a content ID prior to existence of the content. Given the content ID information and the license for encryption, the content can be encrypted after creation in a manner that is available to be used by the users who have purchased the license. However, if the content ID information and the license for encryption are not available, access to the content shall be denied.

Further, a predetermined symmetric key can be generated in advance of content creation, and stored with the rights label. Afterwards, the same key can be used to encrypt the content once it is created. However, as noted above every user can receive a different key. In another alternative, the user can be given an authorization token, which the user can exchange for the license later on.

The controller 302 can process the security parameters and the rights management steps. Lost-card verification, lost-card reports, card-usage reports, security alert reports, and tracking reports can be associated or combined with the rights management reports, such as reports for revoked rights, denied rights, renewed rights, usage patterns, and micropayments.

In the preferred embodiments, the label is a placeholder. the label need not have to have specific content or usage rights. The label can be a placeholder for both usage rights and content. Or for just one of these two. For example, the label can be a file with a pointer (or empty data portion) for three things: content, usage rights and an association means. The association means can be supplied first. The other two pieces of information can be supplied subsequently in any order. Conventionally, content is created first and then rights are associated with the content. With the invention, an association of content to rights can be created before the content is even created.

The invention may be readily implemented in software using object or object-oriented software development environment that provides portable source code that can be used on a variety of computer hardware platforms. For example the software can be written in the JAVA™ language and run in a JAVA™ virtual machine. Alternatively, the disclosed operations may be implemented partially or fully in a hardware using standard logic circuits or VLSI designs. The hardware can include any type of general purpose computer, dedicated computer, or other devices.

The distribution, accounting, and other functions of the distributor and clearinghouse can be accomplished by any party on any device. For example, the content can be rendered on an eBook reader or PDA in response to entry of a code or insertion of a smartcard into a reader and accounting can be accomplished when the digital work or accounting data is returned to a specific source. The division of tasks disclosed herein is only an example. Usage rights and or accounting data can be encapsulated with the digital work or can be stored separately. Code for rendering, decrypting, or otherwise permitting or limiting use of the content can be stored on any device or can be encapsulated with the digital work. Any distribution arrangement can be used with the invention and such arrangements can include any combination of devices, such as personal computers, servers, PDAs, and the like communicating with one another in any manner as is necessary to transfer the desired information.

The invention has been described in connection with the above embodiments. However, it should be appreciated that many alternates, modifications and variations may be made to the embodiments of the invention without departing from the scope of the invention as defined by the appended claims and legal equivalents.

What is claimed is:

1. A computer-implemented method executed by one or more computing devices for creating a digital work, the method comprising:
   before content is created, generating, by at least one of the one or more computing devices, a label associated with the content, and associating, by at least one of the one or more computing devices, a usage right with the label;
   receiving, by at least one of the one or more computing devices, information related to a user environment;
   selecting, by at least one of the one or more computing devices, an instance of the content appropriate for the user environment; and
   after the content is created, associating, by at least one of the one or more computing devices, the usage right with the selected instance of the content, thereby creating the digital work.

2. The method of claim 1, wherein the content is created based on the occurrence of a live event.

3. The method of claim 1, wherein one or more instances of the content are created pursuant to a subscription.

4. The method of claim 1, further comprising distributing, by at least one of the one or more computing devices, the digital work.

5. The method of claim 1, further comprising permitting, by at least one of the one or more computing devices, utilization of the selected instance of the content in accordance with the usage right.

6. The method of claim 1, wherein the usage right corresponds to a user's right to at least one of alter, edit, copy, print, view, render, access, and execute the instance of the content.

7. The method of claim 1, wherein the instance of the content includes at least one of a written, aural, graphical, audio, pictorial, and video based element.

8. The method of claim 1, further comprising securing, by at least one of the one or more computing devices, at least one of the selected instance of the content and the label.

9. The method of claim 8, wherein the securing step comprises encrypting and storing the instance of the content.

10. The method of claim 8, wherein the label includes a predetermined security key associated with the instance of the content, and at least one of the selected instance of the content and the label are encrypted with the security key.

11. The method of claim 1, wherein the selecting step comprises:
   providing, by at least one of the one or more computing devices, information identifying one or more instances of the content based on the information related to the user environment; and
   receiving, by at least one of the one or more computing devices, information selecting one of the identified instances of the content.

12. The method of claim 1, wherein only one instance of the content is identified based on the information related to the user environment, and wherein the identified instance of the content is selected by default.

13. The method of claim 1, wherein the label exists within a service, and the instances of the content appropriate for the user environment are identified by the service based on the label and the information related to the user environment.

14. The method of claim 1, wherein the label includes a content indicator.

15. The method of claim 1, wherein the content is a future appropriation of content for a distributor.

16. An apparatus for creating a digital work, the apparatus comprising:
one or more processors; and
one or more memories operatively coupled to at least one of the one or more processors and containing instructions that, when executed by at least one of the one or more processors, cause at least one of the one or more processors to:
before content is created, generate a label associated with the content, and associate a usage right with the label;
receive information related to a user environment;
select an instance of the content appropriate for the user environment; and
after the content is created, associate the usage right with the selected instance of the content, thereby creating the digital work.

17. The apparatus of claim 16, wherein the content is created based on the occurrence of a live event.

18. The apparatus of claim 16, wherein one or more instances of the content are created pursuant to a subscription.

19. The apparatus of claim 16, further comprising instructions that, when executed by at least one of the one or more processors, cause at least one of the one or more processors to distribute the digital work.

20. The apparatus of claim 16, further comprising instructions that, when executed by at least one of the one or more processors, cause at least one of the one or more processors to permit utilization of the selected instance of the content in accordance with the usage right.

21. The apparatus of claim 16, wherein the usage right corresponds to a user's right to at least one of alter, edit, copy, print, view, render, access, and execute the instance of the content.

22. The apparatus of claim 16, wherein the instance of the content includes at least one of a written, aural, graphical, audio, pictorial, and video based element.

23. The apparatus of claim 16, further comprising instructions that, when executed by at least one of the one or more processors, cause at least one of the one or more processors to secure at least one of the selected instance of the content and the label.

24. The apparatus of claim 23, wherein the instructions cause at least one of the one or more processors to secure at least one of the selected instance of the content and the label by encrypting and storing the instance of the content.

25. The apparatus of claim 23, wherein the label includes a predetermined security key associated with the instance of the content, and at least one of the selected instance of the content and the label are encrypted with the security key.

26. The apparatus of claim 16, wherein the instructions cause at least one of the one or more processors to select by:
providing information identifying one or more instances of the content based on the information related to the user environment; and
receiving information selecting one of the identified instances of the content.

27. The apparatus of claim 16, wherein only one instance of the content is identified based on the information related to the user environment, and wherein the identified instance of the content is selected by default.

28. The apparatus of claim 16, wherein the label exists within a service, and the instances of the content appropriate for the user environment are identified by the service based on the label and the information related to the user environment.

29. The apparatus of claim 16, wherein the label includes a content indicator.

30. The apparatus of claim 16, wherein the content is a future appropriation of content for a distributor.

31. At least one non-transitory computer-readable medium storing computer-readable instructions that, when executed by one or more computing devices, cause at least one of the one or more computing devices to:
before content is created, generate a label associated with the content, and associate a usage right with the label;
receive information related to a user environment;
select an instance of the content appropriate for the user environment; and
after the content is created, associate the usage right with the selected instance of the content, thereby creating the digital work.

32. The at least one non-transitory computer-readable medium of claim 31, wherein the content is created based on the occurrence of a live event.

33. The at least one non-transitory computer-readable medium of claim 31, wherein one or more instances of the content are created pursuant to a subscription.

34. The at least one non-transitory computer-readable medium of claim 31, further comprising instructions that, when executed by at least one of the one or more processors, cause at least one of the one or more processors to distribute the digital work.

35. The at least one non-transitory computer-readable medium of claim 31, further comprising instructions that, when executed by at least one of the one or more processors, cause at least one of the one or more processors to permit utilization of the selected instance of the content in accordance with the usage right.

36. The at least one non-transitory computer-readable medium of claim 31, wherein the usage right corresponds to a user's right to at least one of alter, edit, copy, print, view, render, access, and execute the instance of the content.

37. The at least one non-transitory computer-readable medium of claim 31, wherein the instance of the content includes at least one of a written, aural, graphical, audio, pictorial, and video based element.

38. The at least one non-transitory computer-readable medium of claim 31, further comprising instructions that, when executed by at least one of the one or more processors, cause at least one of the one or more processors to secure at least one of the selected instance of the content and the label.

39. The at least one non-transitory computer-readable medium of claim 38, wherein the instructions cause at least one of the one or more processors to secure at least one of the selected instance of the content and the label by encrypting and storing the instance of the content.

40. The at least one non-transitory computer-readable medium of claim 38, wherein the label includes a predetermined security key associated with the instance of the content, and at least one of the selected instance of the content and the label are encrypted with the security key.

41. The at least one non-transitory computer-readable medium of claim 31, wherein the instructions cause at least one of the one or more processors to select by:
providing information identifying one or more instances of the content based on the information related to the user environment; and
receiving information selecting one of the identified instances of the content.

42. The at least one non-transitory computer-readable medium of claim 31, wherein only one instance of the content is identified based on the information related to the user environment, and wherein the identified instance of the content is selected by default.

43. The at least one non-transitory computer-readable medium of claim 31, wherein the label exists within a service, and the instances of the content appropriate for the user environment are identified by the service based on the label and the information related to the user environment.

44. The at least one non-transitory computer-readable medium of claim 31, wherein the label includes a content indicator.

45. The at least one non-transitory computer-readable medium of claim 31, wherein the content is a future appropriation of content for a distributor.

* * * * *